(12) United States Patent
Johnson et al.

(10) Patent No.: US 7,933,592 B2
(45) Date of Patent: Apr. 26, 2011

(54) CELLULAR TELEPHONE SIGNAL MONITORING METHOD AND SYSTEM

(75) Inventors: Sandra K. Johnson, Austin, TX (US); Ruthie D. Lyle, Durham, NC (US); Kelly Malone, San Jose, CA (US); LaTondra Alyce Murray, Durham, NC (US); Demethria Johnson Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 11/838,258

(22) Filed: Aug. 14, 2007

(65) Prior Publication Data

US 2009/0047944 A1    Feb. 19, 2009

(51) Int. Cl.
*H04W 24/00* (2009.01)
*H04W 40/00* (2009.01)
*H04M 11/04* (2006.01)

(52) U.S. Cl. .................. 455/424; 455/446; 455/404.2
(58) Field of Classification Search .................. 455/424
See application file for complete search history.

(56) References Cited

U.S. PATENT DOCUMENTS

| | | | |
|---|---|---|---|
| 6,330,438 B1 * | 12/2001 | McClelland et al. | 455/421 |
| 7,072,641 B2 | 7/2006 | Satapathy | |
| 2004/0203607 A1 * | 10/2004 | Satapathy | 455/412.1 |
| 2006/0068731 A1 * | 3/2006 | Seier | 455/226.2 |
| 2006/0135180 A1 | 6/2006 | Jakel et al. | |
| 2006/0183487 A1 * | 8/2006 | Allen et al. | 455/456.5 |
| 2006/0194553 A1 | 8/2006 | Ozaki et al. | |
| 2006/0205371 A1 | 9/2006 | Kitani et al. | |

FOREIGN PATENT DOCUMENTS

WO    WO2006090223 A1    8/2007

* cited by examiner

*Primary Examiner* — Huy Phan
*Assistant Examiner* — Yu (Andy) Gu
(74) *Attorney, Agent, or Firm* — Schmeiser, Olsen & Watts; Anna L. Linne

(57) ABSTRACT

A cellular telephone signal monitoring method and system. The method includes receiving and storing by a computing system from a first cellular telephone, a first profile associated with a first user of the first cellular telephone and first monitoring data associated with the first user and the first cellular telephone. The computing system receives and stores from a plurality of cellular telephones, first additional monitoring data associated with a plurality of users and the plurality of cellular telephone. The computing system analyzes the first monitoring data and the first additional monitoring data. The computing system generates a first analysis report based on results of the analyzing. The computing system transmits to the first cellular telephone and the plurality of cellular telephones the first analysis report.

20 Claims, 3 Drawing Sheets

US 7,933,592 B2

CELLULAR TELEPHONE SIGNAL MONITORING METHOD AND SYSTEM

FIELD OF THE INVENTION

The present invention relates to a method and associated system for monitoring signal strength for signals received by cellular telephones and generating reports based on results received from the monitoring.

BACKGROUND OF THE INVENTION

Monitoring dataflow between electrical devices typically comprises a complicated and inefficient process with little flexibility. Detailed analysis illustrating the dataflow and additional information associated with the electrical devices may be necessary in order to select various electrical devices for use. Users currently perform a detailed analysis that is very time consuming and inaccurate. Accordingly, there exists a need in the art to overcome at least some of the deficiencies and limitations described herein above.

SUMMARY OF THE INVENTION

The present invention provides a cellular telephone monitoring method comprising:

receiving, by a computing system from a first cellular telephone, a first profile comprising preferences associated with a first user of said first cellular telephone;

storing, by said computing system, said first profile;

receiving, by said computing system from said first cellular telephone, first monitoring data associated with said first user and said first cellular telephone;

storing, by said computing system, said first monitoring data;

receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing; and transmitting, by said computing system to said first cellular telephone and said plurality of cellular telephones, said first analysis report.

The present invention provides a computing system comprising a processor coupled to a computer-readable memory unit, said memory unit comprising instructions that when executed by the processor implement a cellular telephone monitoring method, said method comprising:

receiving, by said computing system from a first cellular telephone, a first profile comprising preferences associated with a first user of said first cellular telephone;

storing, by said computing system, said first profile;

receiving, by said computing system from said first cellular telephone, first monitoring data associated with said first user and said first cellular telephone;

storing, by said computing system, said first monitoring data;

receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing; and transmitting, by said computing system to said first cellular telephone and said plurality of cellular telephones, said first analysis report.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a cellular telephone monitoring method, said method comprising:

receiving, by said computing system from a first cellular telephone, a first profile comprising preferences associated with a first user of said first cellular telephone;

storing, by said computing system, said first profile;

receiving, by said computing system from said first cellular telephone, first monitoring data associated with said first user and said first cellular telephone;

storing, by said computing system, said first monitoring data;

receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing; and transmitting, by said computing system to said first cellular telephone and said plurality of cellular telephones, said first analysis report.

The present invention provides a computer program product, comprising a computer usable medium comprising a computer readable program code embodied therein, said computer readable program code adapted to implement a cellular telephone monitoring method within a computing system, said method comprising:

receiving, by said computing system from a first cellular telephone, a first profile comprising preferences associated with a first user of said first cellular telephone;

storing, by said computing system, said first profile;

receiving, by said computing system from said first cellular telephone, first monitoring data associated with said first user and said first cellular telephone;

storing, by said computing system, said first monitoring data;

receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing; and transmitting, by said computing system to said first cellular telephone and said plurality of cellular telephones, said first analysis report.

The present invention advantageously provides a method and associated system capable of monitoring dataflow between electrical devices and performing a detailed analysis illustrating the dataflow.

DETAILED DESCRIPTION OF THE INVENTION

Figure 1:
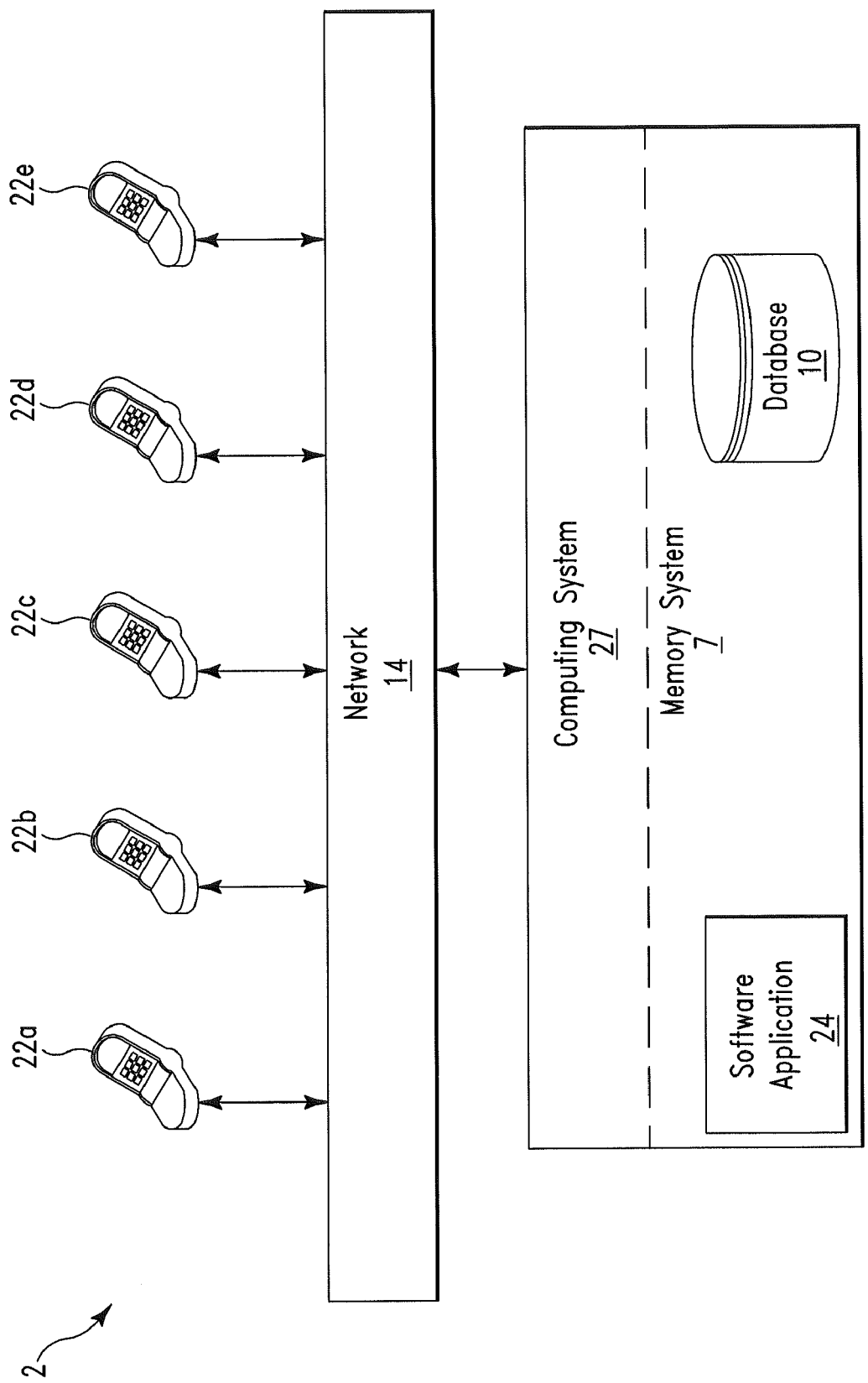
FIG. 1 illustrates a system for monitoring signal strength for signals received by cellular telephones and generating reports and maps based on results received from the monitoring, in accordance with embodiments of the present invention.

FIG. 1 illustrates a system 2 for monitoring signal strength for signals received by cellular telephones 22a . . . 22e and generating reports and maps based on results received from the monitoring, in accordance with embodiments of the present invention. Alternatively, cellular telephones 22a . . . 22e could be replaced by any type of communication devices such as, inter alia, personal digital assistants (PDAs), two way radios, computers, etc. System 2 comprises cellular telephones 22a . . . 22e, a network 14 (i.e., cellular), and a computing system 27. Cellular telephones 22a . . . 22e communicate with each other and computing system 27 through network 14. Computing system 27 comprises a memory system 7. Memory system 7 comprises a software application 24 and a database 10. Alternatively, memory system 7 may be located external to computing system 27.

The following description with reference to cellular telephone 22a additionally applies to cellular telephones 22b . . . 22e. In order to initiate a monitoring process within system 2, a user of cellular telephone 22a enters a user profile into cellular telephone 22a. The user profile comprises user preferences associated with the user. The user preferences may comprise, inter alia, personal/business contacts, ring styles for cellular telephone 22a, keypad options for cellular telephone 22a, a notification method or means (e.g., visual means, audible means, etc) for receiving messages associated with a signal strength for a signal received by cellular telephone 22a, a selected threshold value for the signal strength, etc. The user profile is stored within cellular telephone 22a. Additionally, the user profile (or copy of) is transmitted to computing system 27 and stored in database 10. When the user of cellular telephone 22a operates cellular telephone 22a (i.e., makes a phone call), a signal strength of a signal received or transmitted to/from cellular telephone 22a is monitored by monitoring circuitry located within cellular telephone 22a. The signal strength is compared to a selected threshold value for the signal strength from the user profile and when the signal strength reaches the selected threshold value, the user is notified (i.e., via cellular telephone 22a) that the selected threshold value has been reached. The user may be notified visually (e.g., by a light or series of lights on cellular telephone 22a), audibly (e.g., a beep, a chime, etc), or by a movement (e.g., a vibration of cellular telephone 22a). Additionally (and possibly simultaneously), cellular telephone 22a transmits threshold information specifying that the selected threshold has been reached to computing system 27 (i.e., belonging to a cellular service provider for cellular telephone 22). The threshold information is saved in database 10. Additional information associated with the user and cellular telephone 22a is also transmitted to computing system 27 and stored in database 10. The additional information may comprise, inter alia, the user's location (e.g., longitude, latitude, altitude, etc), a type or model number of cellular telephone 22a, and the actual signal strength of the signal received or transmitted to/from cellular telephone 22a (e.g., very low, low, moderate, high, etc).

Likewise, as described, supra, with respect to cellular telephone 22a, users of cellular telephones 22b . . . 22e enter user profiles into their associated cellular telephone (i.e., cellular telephones 22b . . . 22e). Each user profile is stored within an associated cellular telephone 22b . . . 22e. Additionally, each user profile (or copy of) is transmitted to computing system 27 and stored in database 10. When each user of cellular telephones 22b . . . 22e operates the cellular telephone (i.e., makes a phone call), a signal strength of a signal received or transmitted to/from the cellular telephone is monitored and compared to a selected threshold value for the signal strength from the associated user profile and when the signal strength reaches the selected threshold value, the user is notified (i.e., via the associated cellular telephone) that the selected threshold value has been reached. Additionally (and possibly simultaneously), each of cellular telephones 22b . . . 22e transmits threshold information indicating that the selected threshold has been reached to computing system 27. The threshold information is saved in database 10. Additional information associated with the user and cellular telephone 22a is also transmitted to computing system 27 and stored in database 10. The additional information may comprise, inter alia, the user's location (e.g., longitude, latitude, altitude, etc), a type or model number of cellular telephone 22a, and the actual signal strength of the signal received or transmitted to/from cellular telephone 22a (e.g., very low, low, moderate, high, etc). first analyzing, by said computing system, said first monitoring data and said first additional monitoring data;

All of the data retrieved from cellular telephones 22a . . . 22e (i.e., user profiles, threshold information, additional information related to user location, type or model number of cellular telephones 22a . . . 22e, actual signal strength, etc) and stored in database 10 is analyzed (i.e., by software application 24) and analysis reports, contour maps (i.e., illustrating cellular coverage areas as a function of geographical location and cellular telephone model/type), and/or cellular telephone ranking reports (i.e., ranking cellular telephone model/types with respect to geographical location or signal strength) are generated. The analysis reports, contour maps, and cellular telephone ranking reports may be stored in database 10 and/or transmitted to cellular telephones 22a . . . 22e. The analysis reports, contour maps, and cellular telephone ranking reports may enable a complete, real-time view of network availability and traffic (i.e., for users of cellular telephones 22a . . . 22e on cellular network 14). Additionally, computing system 27 may be associated with a first cellular service provider and the analysis reports, contour maps, and cellular telephone ranking reports may be transmitted to a plurality of additional (and different) cellular service providers. In this case the analysis reports, contour maps, and cellular telephone ranking reports may be used by many different cellular providers (and user of) to recommend specific cellular telephone types and models that perform well in various geographical locations.

The following description illustrates an example of implementation for monitoring signal strength for signals received by cellular telephones 22a . . . 22e and generating reports and maps based on results received from the monitoring.

In this example, a user (Jane) purchases a cellular telephone and enters her preferences (i.e., user profile) regarding notification of signal strength. The preferences are entered using the cellular phone's keypad and/or interface. Jane has indicated (i.e., through her user profile) that she would like to be notified when the signal strength reaches A bars (A is a variable representing a number of bars) on the display for the cellular telephone. Jane indicates that the form of notification that she prefers would be in the form of the phone vibrating. The signal strength on her model phone (i.e., phone B) is represented by a series of C vertical bars in the upper right hand corner of a display screen on the phone, where C is >/= to A. The user profile is transmitted over a global system for mobile communications (GSM) network (e.g., network 14) to her cellular service provider's (i.e., provider D) data repository/database (e.g., database 10).

As Jane travels, the signal strength varies due to a variance in her proximity to the cellular towers throughout provider B's network. At a given point, Jane's signal reaches A bars, and the phone vibrates to notify her that the signal strength has decreased to A bars. In addition to notifying Jane of the signal strength, her cellular telephone also sends a message through the GSM network to provider D's data repository/database with information regarding Jane's location, the signal strength, and the cellular telephone model number (i.e., phone B).

After a specified period of time or number of data entries specified by Provider D, the data is mined by analytical software (e.g., software application 24), and sorted by phone model number, signal strength, and location (e.g., longitude, latitude, altitude). In addition to receiving this information from Jane, provider D may additionally receive information (i.e., user profiles user locations, signal strengths, and cellular telephone model numbers) from all of its customers. After analyzing all of the data, provider D may generate fine-grained, detailed maps which plot provider D's coverage area within a given geographical region. These maps show network availability as a function of longitude, latitude, altitude, and phone model number. Provider D may also provide statistics regarding the number of customers within a given geographical region whose data was used in generating the coverage information. Provider D may also show similar statistics regarding the types or models of phones used (e.g., phone B, phone X, phone Z, etc) in generating the coverage maps and provide a ranking list of these phones in terms of accessing the network in a given geographical region. The rating system for the phones are set by Provider D e.g., poor=greater than 100 entries, average=10-100 entries, excellent=less than 10 entries. Provider D exchanges coverage information and phone ratings with other cellular providers (e.g., provider E, provider F, etc), who have agreed through an industry standards board to also share similar information with all members of the board. With this information, a complete picture of networks and optimal roaming areas may be provided to Jane Doe and all other cellular customers when they have low signal strength on their own Provider's network. Roaming areas are defined as areas where users may receive a cellular signal outside of their provider's network. The roaming network is shared to users by the following methods from the cellular providers:

1. Documentation from cellular provider to the customer at time of purchase.
2. A customer may find coverage and roaming information on the cellular provider's web site that can be shared at anytime.
3. The cellular provider may send mailings to customers and potential customers.

Figure 2:
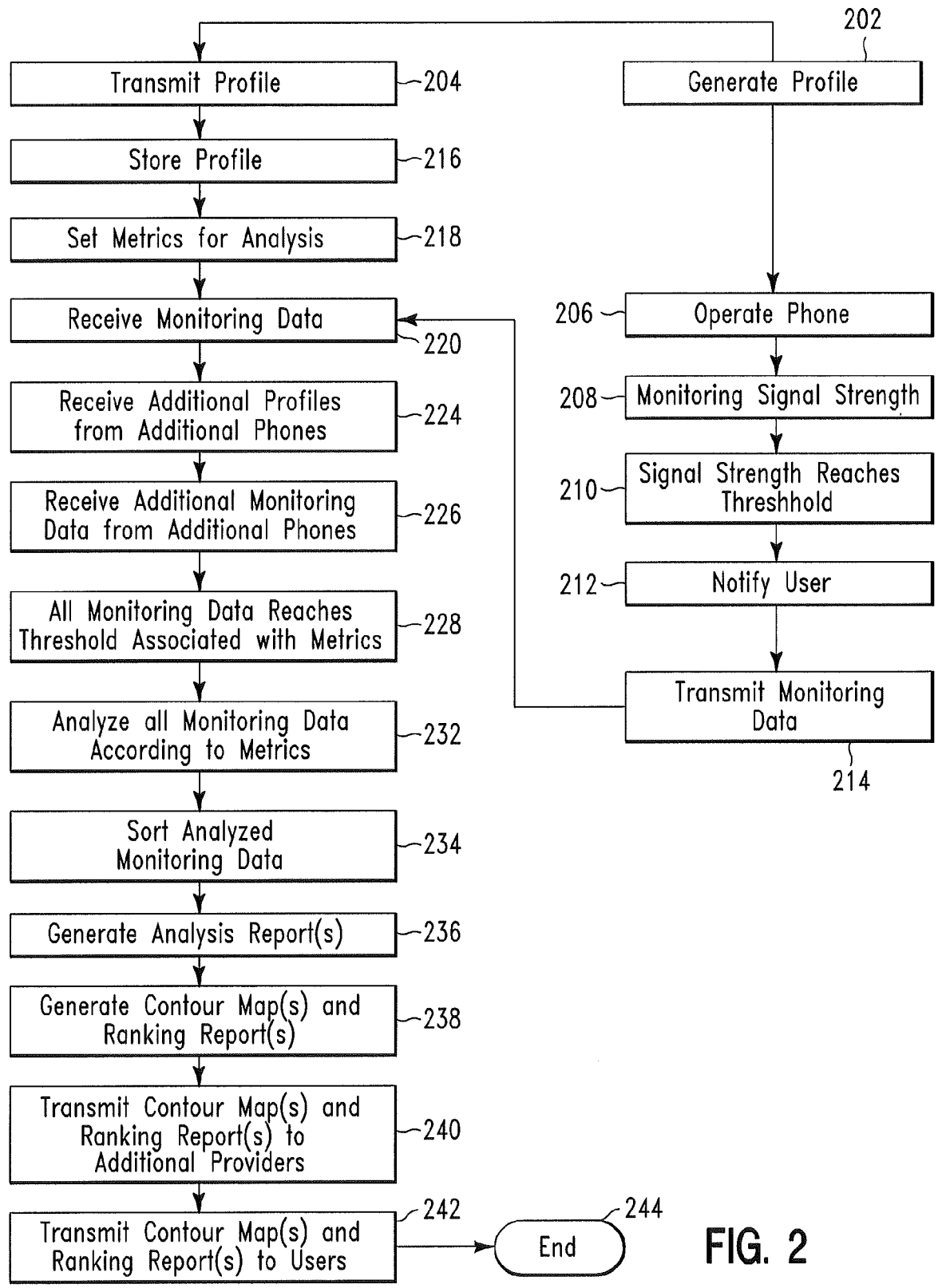
FIG. 2 illustrates a flowchart describing an overall algorithm used by the system of FIG. 1 for monitoring signal strength for signals received by cellular telephones and generating reports and maps based on results received from the monitoring.

FIG. 2 illustrates a flowchart describing an overall algorithm used by system 2 of FIG. 1 for monitoring signal strength for signals received by cellular telephones 22a . . . 22e and generating reports and maps based on results received from the monitoring. In step 202, a user generates a user profile and enters the user profile into a cellular telephone. The user profile comprises user preferences (e.g., personal/business contacts, ring styles, keypad options, method of notification regarding signal strength, etc). The user profile may be entered using the cellular telephone's keypad and/or interface. Steps 206, 208, 210, 212, and 214 may occur simultaneously with step 204, 206, and 218.

In step 204, the user profile is transmitted to over a global system for mobile communications (GSM) network (e.g., network 14 of FIG. 1) to a first cellular service provider's computing system (e.g., computing system 27 of FIG. 1). In step 216, the user profile is stored in a data repository/database (e.g., database 10 of FIG. 1) associated with the first cellular service provider. In step 218, the first cellular service provider sets metrics (i.e., via the computing system) as to how often information in database/data repository from cellular telephones (e.g., location, phone/model type, signal strength, etc) is processed and mined. Cellular provider metrics for data processing/mining may be set as a function of capacity for the database (e.g., gigabytes of data) or periodically (e.g., days, hours, or minutes).

In step 206, the user operates the cellular telephone (e.g., makes a phone call, receives a phone call, etc). In step 208, a signal strength of a signal received by the cellular telephone is monitored on the cellular telephone. A signal strength indicator is displayed on the cellular phone interface. The signal strength may be represented by various methods (e.g., a number of bars, a number, a number of stars, etc). The signal strength is continuously compared to a threshold indicated in the user profile (e.g., the threshold equals 1 bar, the threshold equals 3 bars, etc). In step 210, signal strength reaches the threshold. In step 212, the user is notified by the cellular telephone that the threshold has been reached. The user notification may comprise several formats including, inter alia, an audible format (e.g., a beep, a chime, etc), a visual format (e.g., a flash), a motion format (e.g., a vibration). In step 214, the cellular telephone transmits first monitoring data to the first cellular provider's database or data repository through a data link (e.g., GSM). The first monitoring data may comprise a location (e.g., longitude, latitude, altitude, etc), a phone type (e.g., model x, y, or z), and a signal strength (e.g., 1 bar as specified in the user's profile).

In step 220, the first monitoring data from step 214 is received by and stored within the data repository/database (e.g., database 10 of FIG. 1) associated with the first cellular service provider. In step 224, the first cellular service provider's data repository/database (e.g., database 10 of FIG. 1) associated with the first cellular service provider's computing system (e.g., computing system 27 of FIG. 1) receives and stores additional user profiles from additional users of cellular telephones. In step 226, the first cellular service provider's data repository/database (e.g., database 10 of FIG. 1) associated with the first cellular service provider's computing system (e.g., computing system 27 of FIG. 1) receives and stores additional monitoring data from the addition cellular telephones). The additional monitoring data may comprise a location (e.g., longitude, latitude, altitude, etc), a phone type (e.g., model x, y, or z), and a signal strength (e.g., 1 bar as specified in the user's profile). In step 228, the first monitoring data and the additional monitoring data reaches the metrics generated in step 218. In step 232, the computing system analyzes (e.g., by: text analytics, data mining, statistical processing, etc), the first monitoring data and the additional monitoring data according to the metrics. In step 234, the analyzed data is sorted by location signal strength and phone model/type. In step 236, analysis reports comprising the detailed coverage information are generated using the analyzed and sorted data. In step 236, the computing system generates contour maps comprising the detailed coverage information from the analysis reports. The contour maps illustrate a longitude, latitude, and altitude (e.g., degrees, minutes, seconds, height in standard units (feet, miles, km), etc) of the first user and the additional users. The computing system may also provide information (e.g., reports) regarding the number of users within each contour area. A rating system may be generated for the cellular telephones based on a number of entries in the database/data repository. Additionally, the computing system may generate a ratings list of phone types/models (type x, y, or z) within a contour area and a signal strength list for phones within the contour. In step 240, the contour maps and various lists generated in step 238 by the first cellular provider are transmitted to additional cellular providers. The additional cellular providers may also perform the method illustrated in the flowchart of FIG. 2 and share the results with each other though documentation from an open standards board. An open standards board consists of representative members within a specific industry that sets standard operating procedures. Standards are agreed and decided upon by all of the representative members within the industry. Coverage information among all cellular telephone service providers is used to create a ranking of optimal coverage. Optimal coverage is categorized by phone type (e.g., type x, y, or z) and cellular provider (e.g., provider x, provider y, provider z, etc). In step 242, the contour maps and various lists generated by the various cellular telephone service providers are transmitted to all of the cellular phone users from the various cellular telephone service providers. The process ends in step 244.

Figure 3:
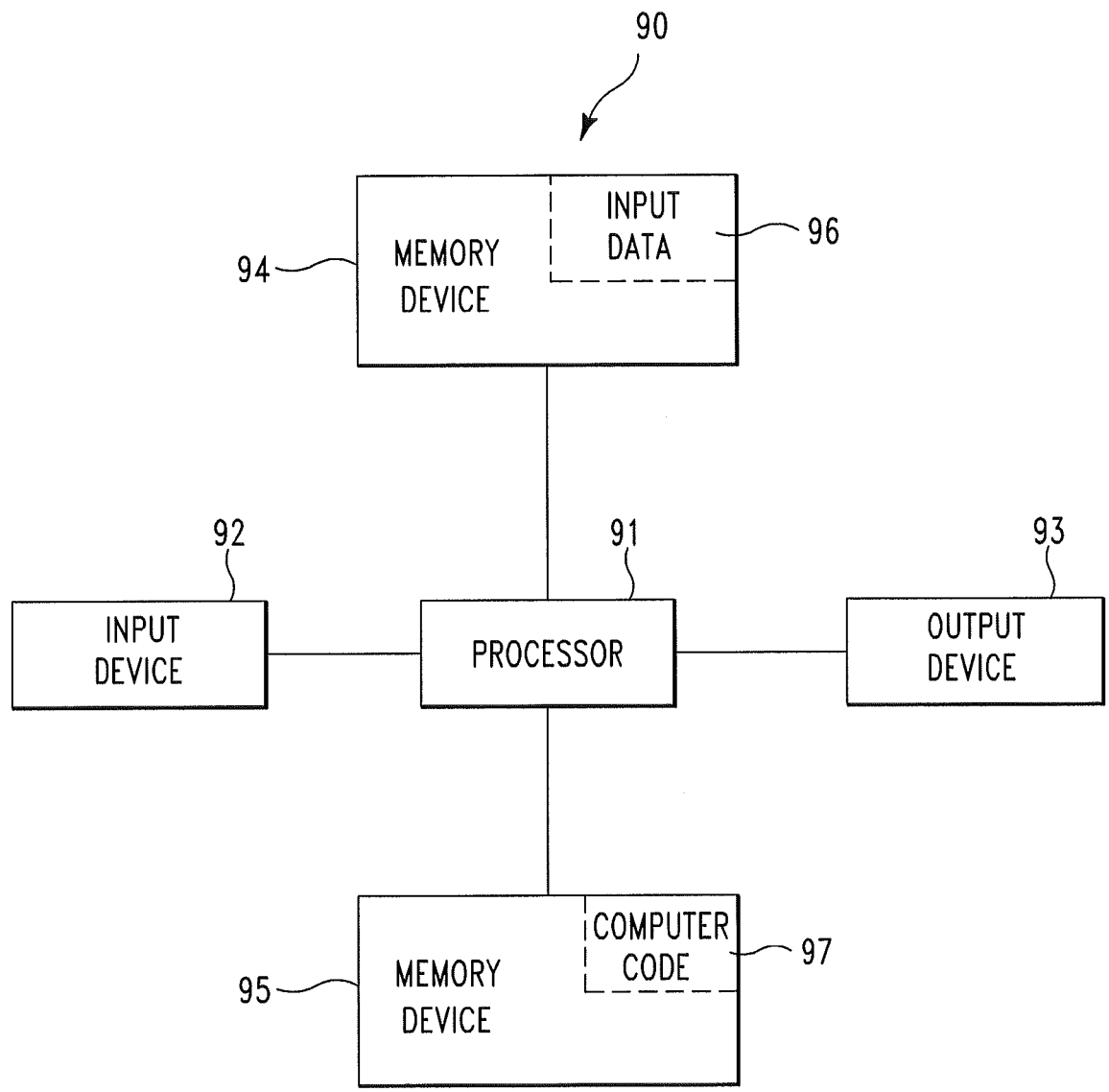
FIG. 3 illustrates a computer apparatus used for monitoring signal strength for signals received by cellular telephones and generating reports and maps based on results received from the monitoring, in accordance with embodiments of the present invention.

FIG. 3 illustrates a computer apparatus 90 (e.g., computing system 27 of FIG. 1) used for monitoring signal strength for signals received by cellular telephones and generating reports and maps based on results received from the monitoring, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for monitoring signal strength for signals received by cellular telephones and generating reports and maps based on results received from the monitoring. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithms of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to monitor signal strength for signals received by cellular telephones and generate reports and maps based on results received from the monitoring. Thus the present invention discloses a process for deploying or integrating computing infrastructure, comprising integrating computer-readable code into the computer system 90, wherein the code in combination with the computer system 90 is capable of performing a method for monitoring signal strength for signals received by cellular telephones and generating reports and maps based on results received from the monitoring. In another embodiment, the invention provides a business method that performs the process steps of the invention on a subscription, advertising, and/or fee basis. That is, a service provider, such as a Solution Integrator, could offer to monitor signal strength for signals received by cellular telephones and generate reports and maps based on results received from the monitoring. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A cellular telephone monitoring method comprising:
   receiving, by a computing system from a first cellular telephone, a first profile comprising preferences associated with a first user of said first cellular telephone;
   storing, by said computing system, said first profile;
   receiving, by said computing system from said first cellular telephone, first monitoring data associated with said first user and said first cellular telephone;
   storing, by said computing system, said first monitoring data;
   receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing; and transmitting, by said computing system to said first cellular telephone and said plurality of cellular telephones, said first analysis report;

receiving, by said computing system from said first cellular telephone, second monitoring data associated with said first user and said first cellular telephone;

storing, by said computing system, said second monitoring data;

receiving, by said computing system from said plurality of cellular telephones, second additional monitoring data associated with said plurality users and said plurality of cellular telephones;

storing, by said computing system, said second additional monitoring data;

second analyzing, by a computer processor of said computing system, said second monitoring data and said second additional monitoring data;

generating, by said computing system, a second analysis report based on results of said second analyzing; and transmitting, by said computing system to said first cellular telephone and said plurality cellular telephones, said second analysis report, wherein said second analysis report differs from said first analysis report;

generating, by said computing system using information from said first analysis report and said second analysis report, a contour map illustrating cellular coverage areas as a function of geographical location and cellular telephone model/type; and generating, by said computing system using said information from said first analysis report and said second analysis report, a cellular telephone ranking report ranking each said cellular telephone model/type.

2. The method of claim 1, wherein said computing system belongs to a first cellular service provider, and wherein said method further comprises:

transmitting, by said computing system, said contour map and said cellular telephone ranking report to additional computing systems belonging to additional cellular service providers.

3. The method of claim 1, further comprising:

receiving, by said computing system, metrics data specifying a periodic interval for performing said first analyzing and said second analyzing.

4. The method of claim 1, wherein said preferences associated with said first user comprise information selected from the group consisting of personal/business contacts, ring styles for said first cellular telephone, keypad options for said first cellular telephone, a notification method for receiving messages associated with a signal strength for a signal received by said first cellular telephone, and a threshold value for said signal strength.

5. The method of claim 1, wherein said first monitoring data comprises information selected from the group consisting of a location of said first cellular telephone, a model type of said first cellular telephone, and an actual signal strength of a signal received by said first cellular telephone, and wherein said first additional monitoring data comprises information selected from the group consisting of a location of each cellular telephone of said plurality of cellular telephones, a model type of each cellular telephone of said plurality of cellular telephones, and an actual signal strength of a signal received by each cellular telephone of said plurality of cellular telephones.

6. A computing system comprising a computer processor coupled to a computer-readable memory unit, said memory unit comprising instructions that when executed by the computer processor implement a cellular telephone monitoring method, said method comprising:

receiving, by said computing system from a first cellular telephone, a first profile comprising preferences associated with a first user of said first cellular telephone;

storing, by said computing system, said first profile;

receiving, by said computing system from said first cellular telephone, first monitoring data associated with said first user and said first cellular telephone;

storing, by said computing system, said first monitoring data;

receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing; and transmitting, by said computing system to said first cellular telephone and said plurality of cellular telephones, said first analysis report;

receiving, by said computing system from said first cellular telephone, second monitoring data associated with said first user and said first cellular telephone;

storing, by said computing system, said second monitoring data;

receiving, by said computing system from said plurality of cellular telephones, second additional monitoring data associated with said plurality users and said plurality of cellular telephones;

storing, by said computing system, said second additional monitoring data;

second analyzing, by said computer processor, said second monitoring data and said second additional monitoring data;

generating, by said computing system, a second analysis report based on results of said second analyzing;

transmitting, by said computing system to said first cellular telephone and said plurality cellular telephones, said second analysis report, wherein said second analysis report differs from said first analysis report;

generating, by said computing system using information from said first analysis report and said second analysis report, a contour map illustrating cellular coverage areas as a function of geographical location and cellular telephone model/type; and generating, by said computing system using said information from said first analysis report and said second analysis report, a cellular telephone ranking report ranking each said cellular telephone model/type.

7. The computing system of claim 6, wherein said computing system belongs to a first cellular service provider, and wherein said method further comprises:

transmitting, by said computing system, said contour map and said cellular telephone ranking report to additional computing systems belonging to additional cellular service providers.

8. The computing system of claim 6, wherein said method further comprises:
receiving, by said computing system, metrics data specifying a periodic interval for performing said first analyzing and said second analyzing.

9. The computing system of claim 6, wherein said preferences associated with said first user comprise information selected from the group consisting of personal/business contacts, ring styles for said first cellular telephone, keypad options for said first cellular telephone, a notification method for receiving messages associated with a signal strength for a signal received by said first cellular telephone, and a threshold value for said signal strength.

10. The computing system of claim 6, wherein said first monitoring data comprises information selected from the group consisting of a location of said first cellular telephone, a model type of said first cellular telephone, and an actual signal strength of a signal received by said first cellular telephone, and wherein said first additional monitoring data comprises information selected from the group consisting of a location of each cellular telephone of said plurality of cellular telephones, a model type of each cellular telephone of said plurality of cellular telephones, and an actual signal strength of a signal received by each cellular telephone of said plurality of cellular telephones.

11. A process for supporting computer infrastructure, said process comprising providing at least one support service for at least one of creating, integrating, hosting, maintaining, and deploying computer-readable code in a computing system, wherein the code in combination with the computing system is capable of performing a cellular telephone monitoring method, said method comprising:
receiving, by said computing system from a first cellular telephone, a first profile comprising preferences associated with a first user of said first cellular telephone;
storing, by said computing system, said first profile;
receiving, by said computing system from said first cellular telephone, first monitoring data associated with said first user and said first cellular telephone;
storing, by said computing system, said first monitoring data;
receiving, by said computing system from a plurality of cellular telephones, first additional monitoring data associated with a plurality of users and said plurality of cellular telephones;
storing, by said computing system, said first additional monitoring data;
first analyzing, by said computing system, said first monitoring data and said first additional monitoring data;
generating, by said computing system, a first analysis report based on results of said first analyzing; and
transmitting, by said computing system to said first cellular telephone and said plurality of cellular telephones, said first analysis report;
receiving, by said computing system from said first cellular telephone, second monitoring data associated with said first user and said first cellular telephone;
storing, by said computing system, said second monitoring data;
receiving, by said computing system from said plurality of cellular telephones, second additional monitoring data associated with said plurality users and said plurality of cellular telephones;
storing, by said computing system, said second additional monitoring data;
second analyzing, by a computer processor of the computing system, said second monitoring data and said second additional monitoring data;
generating, by said computing system, a second analysis report based on results of said second analyzing;
transmitting, by said computing system to said first cellular telephone and said plurality cellular telephones, said second analysis report, wherein said second analysis report differs from said first analysis report;
generating, by said computing system using information from said first analysis report and said second analysis report, a contour map illustrating cellular coverage areas as a function of geographical location and cellular telephone model/type; and
generating, by said computing system using said information from said first analysis report and said second analysis report, a cellular telephone ranking report ranking each said cellular telephone model/type.

12. The process of claim 11, wherein said computing system belongs to a first cellular service provider, and wherein said method further comprises:
transmitting, by said computing system, said contour map and said cellular telephone ranking report to additional computing systems belonging to additional cellular service providers.

13. The process of claim 11, wherein said method further comprises:
receiving, by said computing system, metrics data specifying a periodic interval for performing said first analyzing and said second analyzing.

14. The process of claim 11, wherein said preferences associated with said first user comprise information selected from the group consisting of personal/business contacts, ring styles for said first cellular telephone, keypad options for said first cellular telephone, a notification method for receiving messages associated with a signal strength for a signal received by said first cellular telephone, and a threshold value for said signal strength.

15. The process of claim 11, wherein said first monitoring data comprises information selected from the group consisting of a location of said first cellular telephone, a model type of said first cellular telephone, and an actual signal strength of a signal received by said first cellular telephone, and wherein said first additional monitoring data comprises information selected from the group consisting of a location of each cellular telephone of said plurality of cellular telephones, a model type of each cellular telephone of said plurality of cellular telephones, and an actual signal strength of a signal received by each cellular telephone of said plurality of cellular telephones.

16. A computer program product, comprising a tangible computer readable storage medium storing a computer readable program code embodied therein, said computer readable program code adapted to implement a cellular telephone monitoring method within a computing system, said method comprising:
receiving, by said computing system from a first cellular telephone, a first profile comprising preferences associated with a first user of said first cellular telephone;
storing, by said computing system, said first profile;
receiving, by said computing system from said first cellular telephone, first monitoring data associated with said first user and said first cellular telephone;
storing, by said computing system, said first monitoring data;

receiving, by said computing system from a plurality of cellular telephones, first additional monitoring data associated with a plurality of users and said plurality of cellular telephones;

storing, by said computing system, said first additional monitoring data;

first analyzing, by said computing system, said first monitoring data and said first additional monitoring data;

generating, by said computing system, a first analysis report based on results of said first analyzing;

and transmitting, by said computing system to said first cellular telephone and said plurality of cellular telephones, said first analysis report;

receiving, by said computing system from said first cellular telephone, second monitoring data associated with said first user and said first cellular telephone;

storing, by said computing system, said second monitoring data;

receiving, by said computing system from said plurality of cellular telephones, second additional monitoring data associated with said plurality users and said plurality of cellular telephones;

storing, by said computing system, said second additional monitoring data;

second analyzing, by a computer processor of the computing system, said second monitoring data and said second additional monitoring data;

generating, by said computing system, a second analysis report based on results of said second analyzing;

transmitting, by said computing system to said first cellular telephone and said plurality cellular telephones, said second analysis report, wherein said second analysis report differs from said first analysis report;

generating, by said computing system using information from said first analysis report and said second analysis report, a contour map illustrating cellular coverage areas as a function of geographical location and cellular telephone model/type;

and generating, by said computing system using said information from said first analysis report and said second analysis report, a cellular telephone ranking report ranking each said cellular telephone model/type.

17. The computer program product of claim 16, wherein said computing system belongs to a first cellular service provider, and wherein said method further comprises:

transmitting, by said computing system, said contour map and said cellular telephone ranking report to additional computing systems belonging to additional cellular service providers.

18. The computer program product of claim 16, wherein said method further comprises:

receiving, by said computing system, metrics data specifying a periodic interval for performing said first analyzing and said second analyzing.

19. The computer program product of claim 16, wherein said preferences associated with said first user comprise information selected from the group consisting of personal/business contacts, ring styles for said first cellular telephone, keypad options for said first cellular telephone, a notification method for receiving messages associated with a signal strength for a signal received by said first cellular telephone, and a threshold value for said signal strength.

20. The computer program product of claim 16, wherein said first monitoring data comprises information selected from the group consisting of a location of said first cellular telephone, a model type of said first cellular telephone, and an actual signal strength of a signal received by said first cellular telephone, and wherein said first additional monitoring data comprises information selected from the group consisting of a location of each cellular telephone of said plurality of cellular telephones, a model type of each cellular telephone of said plurality of cellular telephones, and an actual signal strength of a signal received by each cellular telephone of said plurality of cellular telephones.

* * * * *